US009254987B2

(12) United States Patent
Alba

(10) Patent No.: US 9,254,987 B2
(45) Date of Patent: *Feb. 9, 2016

(54) TOWER ERECTION LIFT KIT TOOLS

(71) Applicant: MJT Holdings, LLC, Valdosta, GA (US)

(72) Inventor: Tony J. Alba, West Covina, CA (US)

(73) Assignee: MJT Holdings, LLC, Valdosta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/011,692

(22) Filed: Aug. 27, 2013

(65) Prior Publication Data
US 2014/0042763 A1 Feb. 13, 2014

Related U.S. Application Data

(63) Continuation of application No. 12/856,525, filed on Aug. 13, 2010, now Pat. No. 8,596,700.

(60) Provisional application No. 61/234,246, filed on Aug. 14, 2009.

(51) Int. Cl.
| B66C 1/10 | (2006.01) |
| B66C 1/48 | (2006.01) |
| B66C 23/18 | (2006.01) |
| F03D 1/00 | (2006.01) |

(52) U.S. Cl.
CPC . *B66C 1/10* (2013.01); *B66C 1/108* (2013.01); *B66C 1/48* (2013.01); *B66C 23/185* (2013.01); *F03D 1/001* (2013.01); *F05B 2230/61* (2013.01); *Y02E 10/728* (2013.01); *Y10T 403/32213* (2015.01)

(58) Field of Classification Search
USPC ........ 294/215, 89, 82.1; 410/101; 403/78, 79, 403/164; 411/400, 401, 402, 403, 384, 388
See application file for complete search history.

(56) References Cited

U.S. PATENT DOCUMENTS

| 3,297,293 | A | * | 1/1967 | Andrews et al. | 248/499 |
| 3,905,633 | A | * | 9/1975 | Larson | 294/82.1 |
| 5,125,861 | A | * | 6/1992 | Freeman | 411/400 |
| 5,732,991 | A | * | 3/1998 | Tsui | 294/89 |
| 5,775,664 | A | * | 7/1998 | Martin | 248/500 |
| 5,823,588 | A | * | 10/1998 | Morghen | 294/89 |
| 5,979,954 | A | * | 11/1999 | Tsui et al. | 294/215 |
| 6,022,164 | A | * | 2/2000 | Tsui et al. | 403/78 |
| 6,032,993 | A | * | 3/2000 | Kwon | 294/215 |
| 6,039,500 | A | * | 3/2000 | Kwon | 403/78 |
| 6,199,925 | B1 | * | 3/2001 | Alba | 294/215 |

(Continued)

*Primary Examiner* — Paul T Chin
(74) *Attorney, Agent, or Firm* — Lance M. Pritikin, Esq.

(57) ABSTRACT

A mounting tool for use in safely lifting a heavy object such as a wind tower segment. Mounting tools may be provided in a kit that includes a tool that is especially adapted for attachment to the top of the object, and a tool that is especially adapted for attachment to the bottom of the object. Both the top and bottom mounting tools include a mounting bracket for removably mounting the tool to a mounting ring on a heavy object. To accommodate different bolt patterns in mating holes in the objects, the mounting bracket has a slotted mounting hole and two generally annular mounting holes extending therethrough. These mounting holes are arrayed along a common axis. A hoist ring assembly is mounted to the mounting bracket and includes a bail adapted for swiveling and pivoting movement to define a generally hemispheric envelope.

4 Claims, 7 Drawing Sheets

(56) References Cited

U.S. PATENT DOCUMENTS

| | | | |
|---|---|---|---|
| 6,267,422 B1 * | 7/2001 | Alba | 294/215 |
| 6,652,012 B1 * | 11/2003 | Fuller et al. | 411/400 |
| 6,953,212 B2 * | 10/2005 | Alba | 294/217 |
| D542,505 S * | 5/2007 | Alba | D34/35 |
| 7,222,417 B2 * | 5/2007 | Wasileski et al. | 29/798 |
| 7,625,024 B2 * | 12/2009 | Wright et al. | 294/215 |
| 2010/0078950 A1 * | 4/2010 | Inda | 294/1.1 |

* cited by examiner

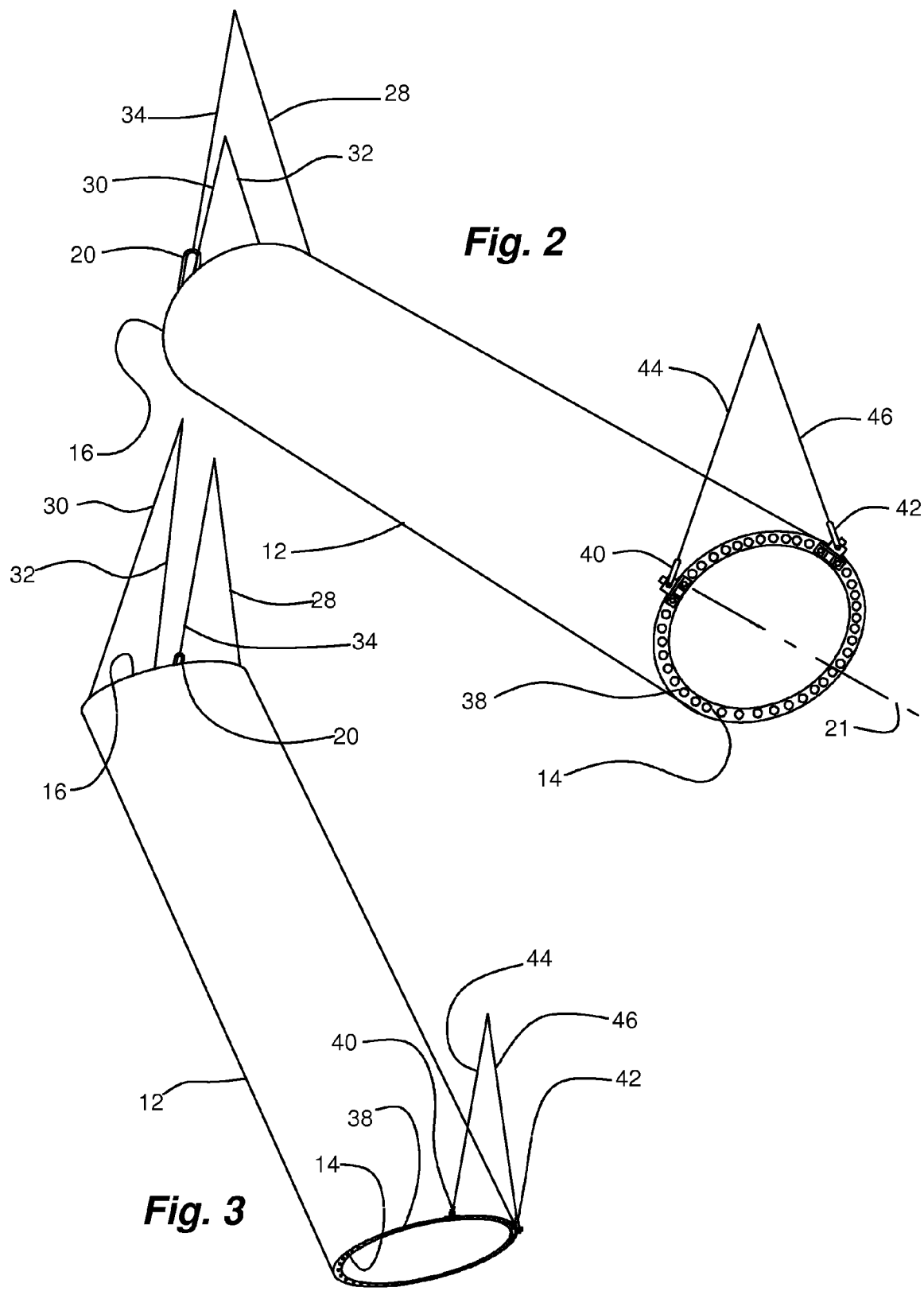

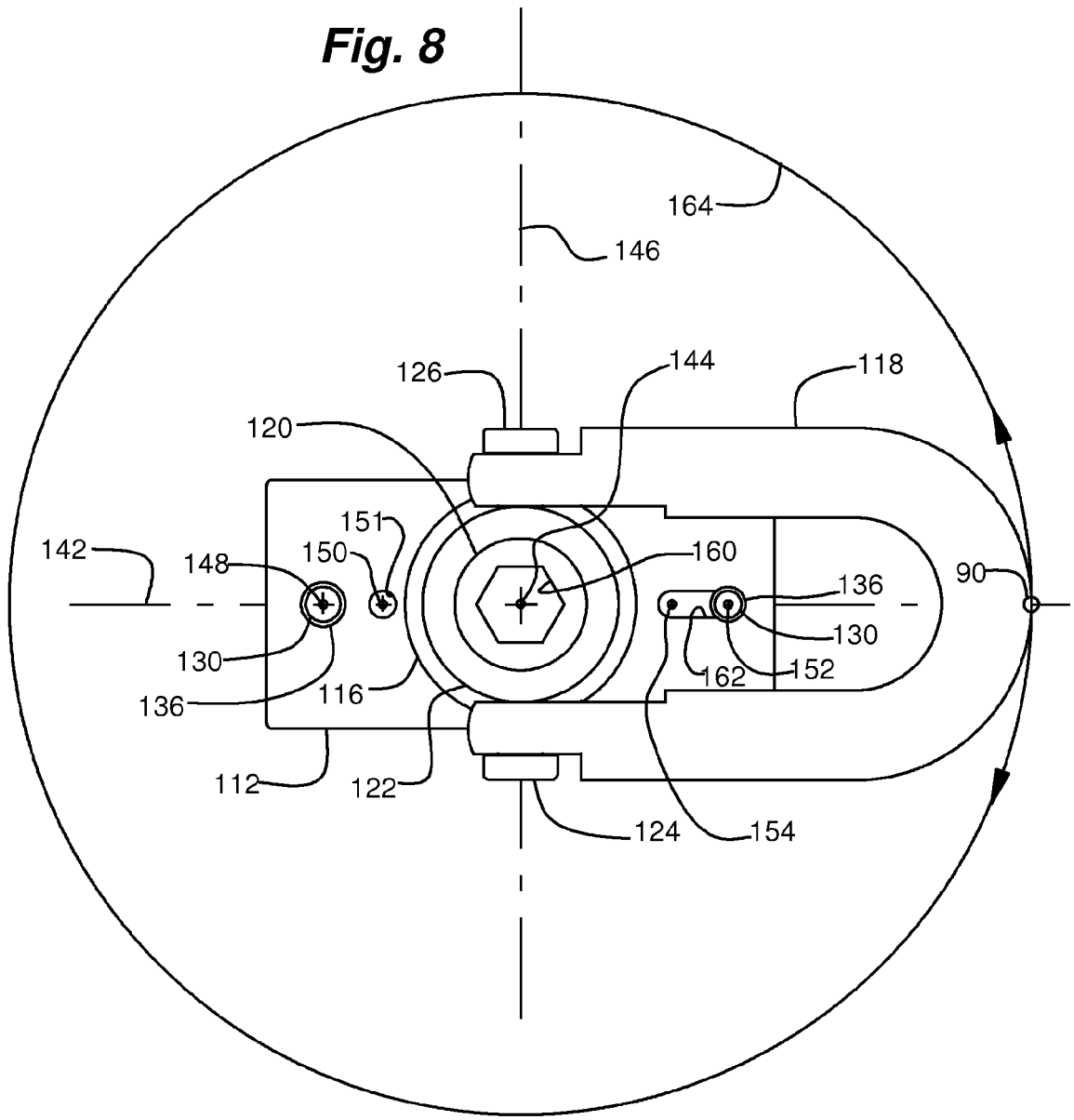

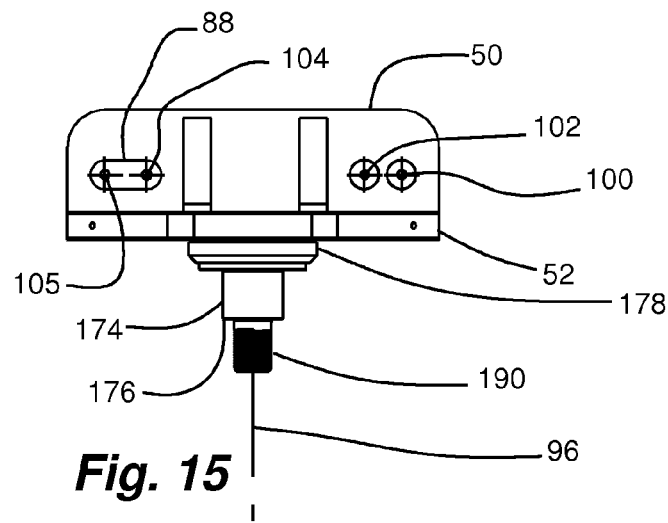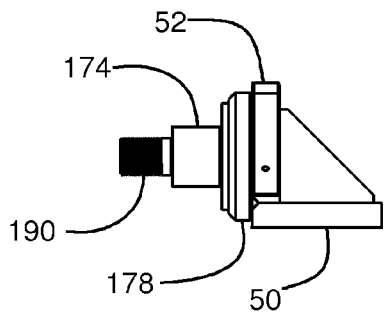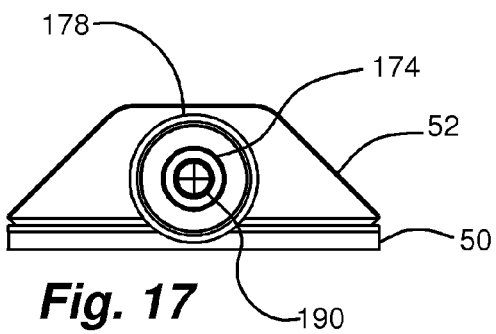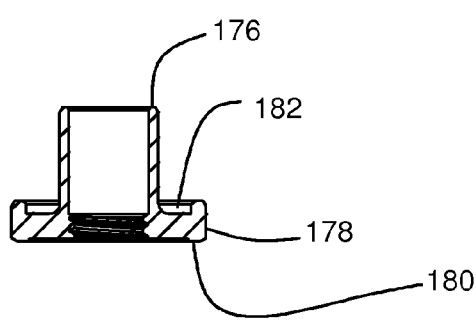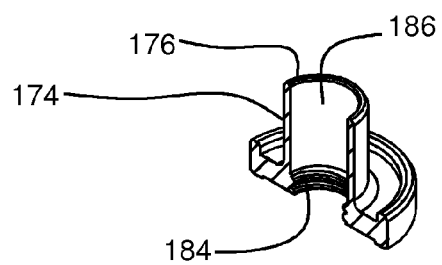

TOWER ERECTION LIFT KIT TOOLS

RELATED APPLICATIONS

This application is a continuation of U.S. patent application Ser. No. 12/856,525, filed Aug. 13, 2010, which claims the benefit of U.S. Provisional application Ser. No. 61/234,246, filed Aug. 14, 2009, the contents of each of which are incorporated by this reference for all purposes as if fully set forth herein.

BACKGROUND OF THE INVENTION

1. Field of the Invention

The invention relates in general to kits of tools and tools for use in erecting heavy objects, and, more particularly, embodiments of the present invention relate to kits of tools and tools for attaching tower segments to lifting devices.

2. Description of the Prior Art

Weld mounted free swiveling and pivoting hoist rings had been previously proposed. See, for example, Alba U.S. Pat. No. 6,953,212, which is hereby incorporated herein in its entirety as though fully set forth hereat.

Wind turbine towers, for example, are typically erected by bolting together a vertical array of frusto-conical tower segments. Each tower segment is typically elongated and has a generally circular mounting ring at each end. These mounting rings include mounting holes arrayed in a circular pattern to accommodate fastening bolts or screws. During erection, the mounting rings on the adjacent ends of mating tower segments are fastened together by means of bolts or studs extended through mating holes in adjacent tower segments. The mating rings are thus bolted together. The mounting rings in different tower segments, and different towers frequently have different hole sizes and hole spacing. Each tower segment is typically manufactured at a fabricating facility, transported to the site of erection, and then hoisted upright, and bolted to adjacent tower segments in a frusto-conical shaped vertical array. Tower segments are typically as much as 10 to 20 feet in diameter, 30 to 50 feet long, and weigh as much as from 80 to 100 tons. Hoisting a tower segment into an installed position requires that both ends of the tower segment be lifted off a transport vehicle or support structure, and then the upper end be hoisted until the tower segment is approximately vertical. The vertically supported tower segment must be accurately positioned and then bolted into place. Large capacity cranes are typically employed to hoist and position the tower segments. Such cranes are attached to the tower segments by way of cables, chains, webs, or the like lifting lines.

Tools that are used for attaching lifting lines to tower segments are typically attached to the mounting rings. Such tools must be safe, reliable, easy to use, and adjustable to accommodate various bolt hole sizes and spacings in different mounting rings. Such tools must also make provisions for adapting to the differences in the requirements for such tools depending on whether they are to be attached to the tops or the bottoms of the tower segments. Such tools should safely and easily accommodate all of the mounting hole sizes and spacings that may be found from one tower segment to another and from one tower to another.

Previously proposed expedients for tools that are used for attaching lifting lines to mounting rings include, for example, Storgaar, U.S. Publication No. 2009/0107062, published Apr. 30, 2009, which is hereby incorporated herein by reference in its entirety as though fully set forth hereat. The prior art devices and methods are not without their shortcomings. A major shortcoming of certain prior art devices and methods is the difficulty in adjusting the prior art tools to safely accommodate different hole sizes and spacings in the structures to which the tools are mounted. Complicated adjusting expedients tended to compromise the reliability and safety of the tools. Further, if mounted incorrectly certain prior art tools could bend or break during a lifting operation. The need for tools that are safe, reliable, rugged, simple to use, and to manufacture had been recognized by those concerned with these matters.

Lifting tools find utility wherever there are heavy objects to be lifted. Frequently, the opposed ends of a heavy object need to be lifted independent of one another to change the orientation of the object between vertical and horizontal. Embodiments of the present lifting tool kits find particular application where both ends of an object need to be hoisted to change the object's orientation. For example, some large heavy objects such as storage tanks, towers, reactors, structural members, and the like are made or shipped in one orientation and must be hoisted by both ends and the ends moved independently of one another into another orientation, such as from a horizontal transportation orientation to a vertical installation orientation, or from a vertical manufacturing orientation to a horizontal storage or transportation orientation.

Hoist rings of various designs that are intended to be attached to heavy loads are well known. See, for example, Alba U.S. Pat. No. 6,953,212, Alba U.S. Pat. No. 6,267,422, Tsui U.S. Pat. No. 5,732,991, Alba U.S. Pat. No. 6,199,925, Tsui et al. U.S. Pat. No. 5,979,954, and Tsui et al. U.S. Pat. No. 6,022,164, each of which is hereby incorporated herein by reference as though fully set forth hereat. The structures of these hoist rings are such that the bails to which lifting lines connect are capable of swiveling and pivoting omni-directionally within at least approximately a hemisphere so as to align the bail with the load that is applied to it. This hemispheric envelope is generally symmetrical around the swiveling axis of the hoist ring. The advantage of a hoist ring that exhibits such hemispheric omni-directionality is that the hoist ring has the same load bearing capacity regardless of the direction of the load within the hemispheric envelope. By contrast, eyebolts have a maximum capacity only when loads are applied along the major axis. The load capacity of an eyebolt falls off quickly as the direction of the applied load changes from axial to an angle to the major axis of the eyebolt.

Hoist rings are classified as critical lifting devices, and are subject to rigorous safety standards. Quality controls on manufacturing operations, testing, and safety margins for strength are very stringent. They must be safe to use by workers at construction sites with a minimum of specialized instruction. Hoist rings should be rugged and simple so that it is difficult to damage them or use them improperly.

These and other difficulties of the prior art have been overcome according to the present invention.

BRIEF SUMMARY OF THE INVENTION

The present invention has been developed in response to the current state of the art, and in particular, in response to these and other problems and needs that have not been fully or completely solved by currently available tools. Thus, it is an overall object of the present invention to effectively resolve at least the problems and shortcomings identified herein. Embodiments of the present invention are particularly suitable for use in erecting wind turbine towers, which may be as much as 100 to 400 or more feet tall.

To acquaint persons skilled in the pertinent arts most closely related to the present invention, embodiments of tools and kits of tools that illustrates a best mode now contemplated for putting the invention into practice is described herein by, and with reference to, the annexed drawings that form a part of the specification. The exemplary embodiments are described in detail without attempting to show all of the various forms and modifications in which the invention might be embodied. As such, the embodiments shown and described herein are illustrative, and as will become apparent to those skilled in the art, can be modified in numerous ways within the scope and spirit of the invention, the invention being measured by the appended claims and not by the details of the specification or drawings.

According to certain embodiments, a kit of tools adapted to be used in the erection of towers and other heavy objects comprises mounting tools including a top tool having a longitudinal axis. The top tool includes a top mounting bracket and a top bail mounted to the top mounting bracket for pivoting movement through at least approximately 180 degrees generally around a top pivoting axis that is approximately normal to the longitudinal axis, and swiveling movement through a full circle generally around a top swiveling axis that is approximately normal to the pivoting axis. The movement of an outermost point on the top bail approximately defines a top hemispherical envelope. The outermost point on the top bail is generally omni-positionable within this envelope. The top mounting bracket includes top mounting holes extending therethrough and arrayed generally along the longitudinal axis. The top mounting holes including a slotted top mounting hole that is elongated generally along the longitudinal axis, and at least two generally annular top mounting holes likewise generally arrayed along the longitudinal axis. The slotted top mounting hole and the annular top mounting holes are generally disposed on opposite sides of the top swiveling axis. A bottom tool has a major axis and a minor axis extending approximately normal to one another. The bottom tool includes a bottom mounting bracket and a bottom bail mounted to the bottom mounting bracket for pivoting and swiveling movement around bottom pivoting and swiveling axes as described with reference to the top bail to approximately define a bottom hemispheric envelope. The top swiveling axis is generally adapted to extend approximately normal to the plane of a mounting ring to which it is mounted, and the bottom swiveling axis is adapted to extend approximately parallel to the plane of a mounting ring to which it is mounted.

According to certain embodiments a mounting tool for use in lifting a heavy object comprises a mounting bracket. The mounting bracket has a slotted mounting hole and two generally annular mounting holes extending therethrough. The mounting holes are arrayed along a common axis. A hoist ring assembly is mounted to the mounting bracket, and includes a bail adapted for swiveling and pivoting movement to define a generally hemispheric envelope. The bail is mounted for swiveling about a swiveling axis. The swiveling axis extends approximately between the two generally annular mounting holes on one side, and the slotted mounting hole on the other side. At least two fastener elements are adapted to project fasteningly through the mounting holes. In certain embodiments, at least one of the fastening elements is a stepped fastening element. When the heavy object has an object axis, the swiveling axis is adapted to extend either generally normally or generally parallel to the object axis. In embodiments where the swiveling axis is adapted to extend generally parallel to the object axis, the hoist ring assembly is adapted to being positioned generally laterally outwardly of the heavy object. According to certain embodiments, the two generally annular mounting holes are located toward one end of the mounting tool, and the slotted mounting hole is located toward an opposed end of the mounting tool. According to further embodiments, the swiveling axis extends generally normal to the common axis.

Other objects, advantages, and novel features of the present invention will become more fully apparent from the following detailed description of the invention when considered in conjunction with the accompanying drawings, or may be learned by the practice of the invention as set forth herein.

BRIEF DESCRIPTION OF THE DRAWINGS

The present invention provides its benefits across a broad spectrum of tower erection assemblies and the handling of other heavy objects. While the description which follows hereinafter is meant to be representative of a number of such applications, it is not exhaustive. As those skilled in the art will recognize, the basic apparatus and method taught herein can be readily adapted to many uses. This specification and the claims appended hereto should be accorded a breadth in keeping with the scope and spirit of the invention being disclosed despite what might appear to be limiting language imposed by the requirements of referring to the specific examples disclosed.

As used herein, terms such as "having," "containing," "including," "comprising," and the like, are open ended terms that indicate the presence of stated elements or features, but do not preclude additional elements or features. The articles "a," "an," and "the" include the plural as well as the singular, unless the context clearly indicates otherwise.

Figure 1:
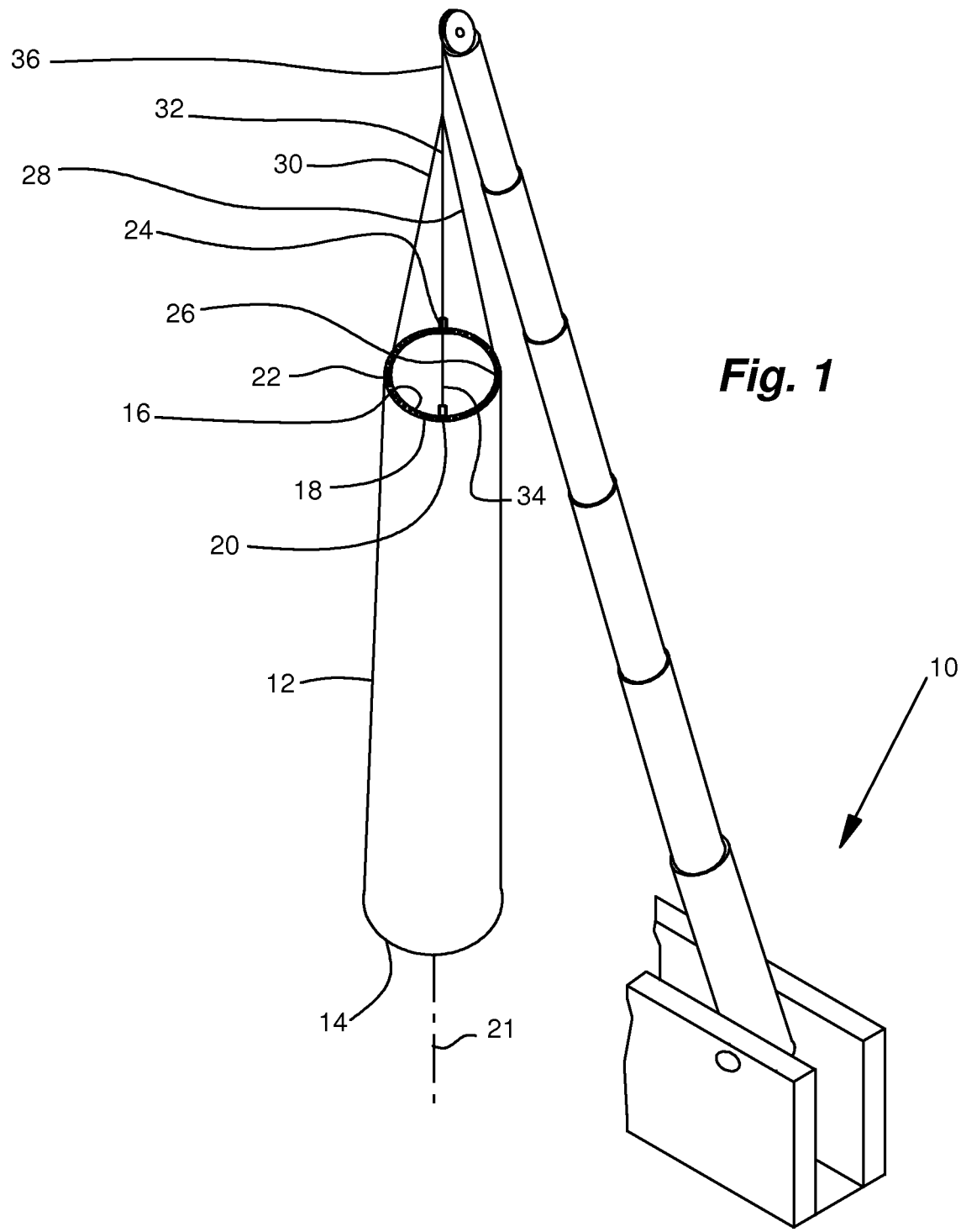

Referring particularly to the drawings for the purposes of illustrating the invention and its presently understood best mode only and not limitation:

FIG. 1 is a diagrammatic perspective view of a conventional crane with a tower segment suspended in the vertical position from lifting lines with four top tools distributed equidistant from one another around the top of the tower segment.

FIG. 2 is a diagrammatic perspective view of a tower segment as it is being lifted by both ends from a generally horizontal position towards a vertical position, and with associated mounting tools comprising four top tools attached to the top end of the tower segment, and two bottom tools attached to a bottom end of the tower segment.

FIG. 3 is a diagrammatic perspective view of a tower segment that has been lifted to a nearly vertical position with four top tools attached to the top end and two bottom tools attached to the bottom end.

Figure 4:
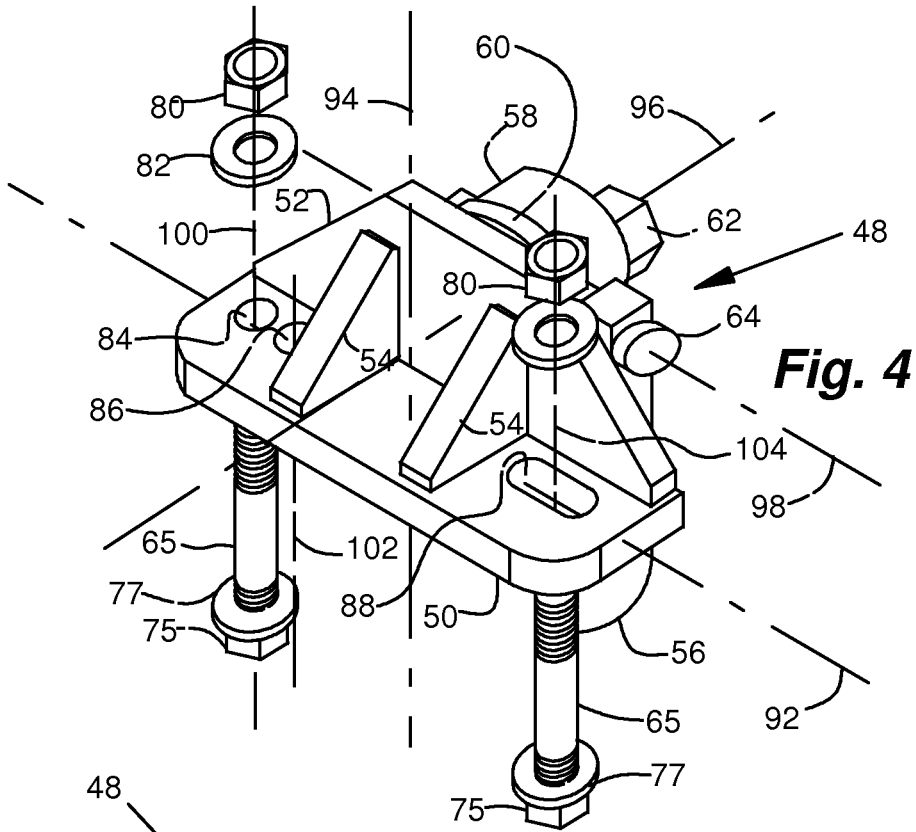

FIG. 4 is a diagrammatic perspective view of an embodiment of a bottom tool that is adapted to be attached to a bottom mounting ring of a tower segment with a bottom swiveling axis extending generally parallel to the plane defined by the revolution of the diameter of bottom mounting ring.

Figure 5:
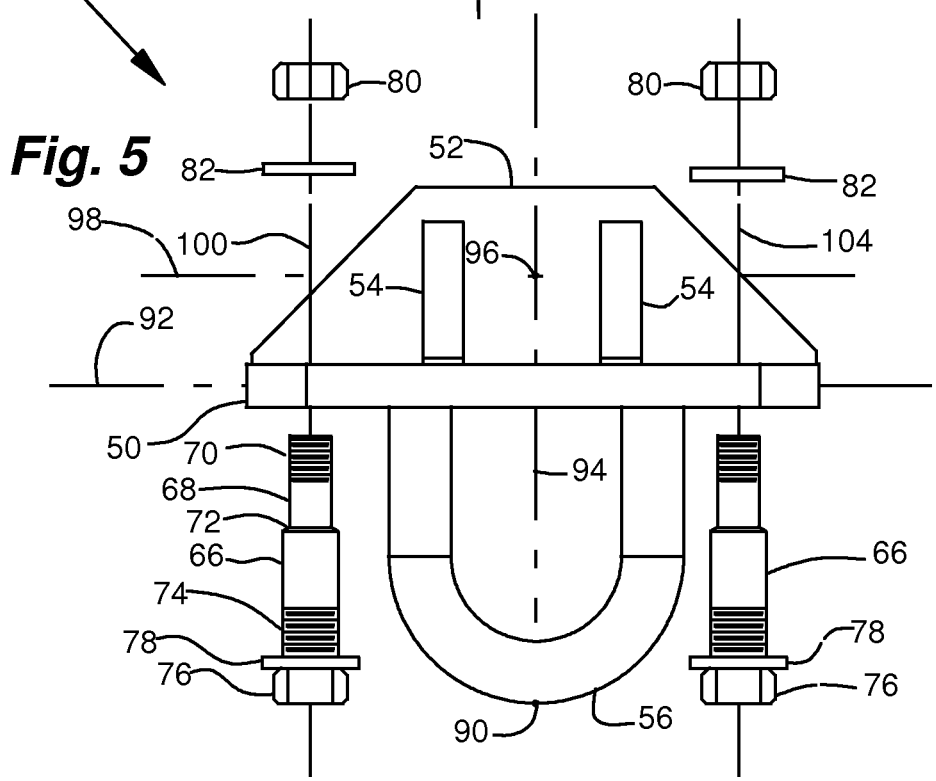

FIG. 5 is a diagrammatic back view of an embodiment of FIG. 4.

Figure 6:
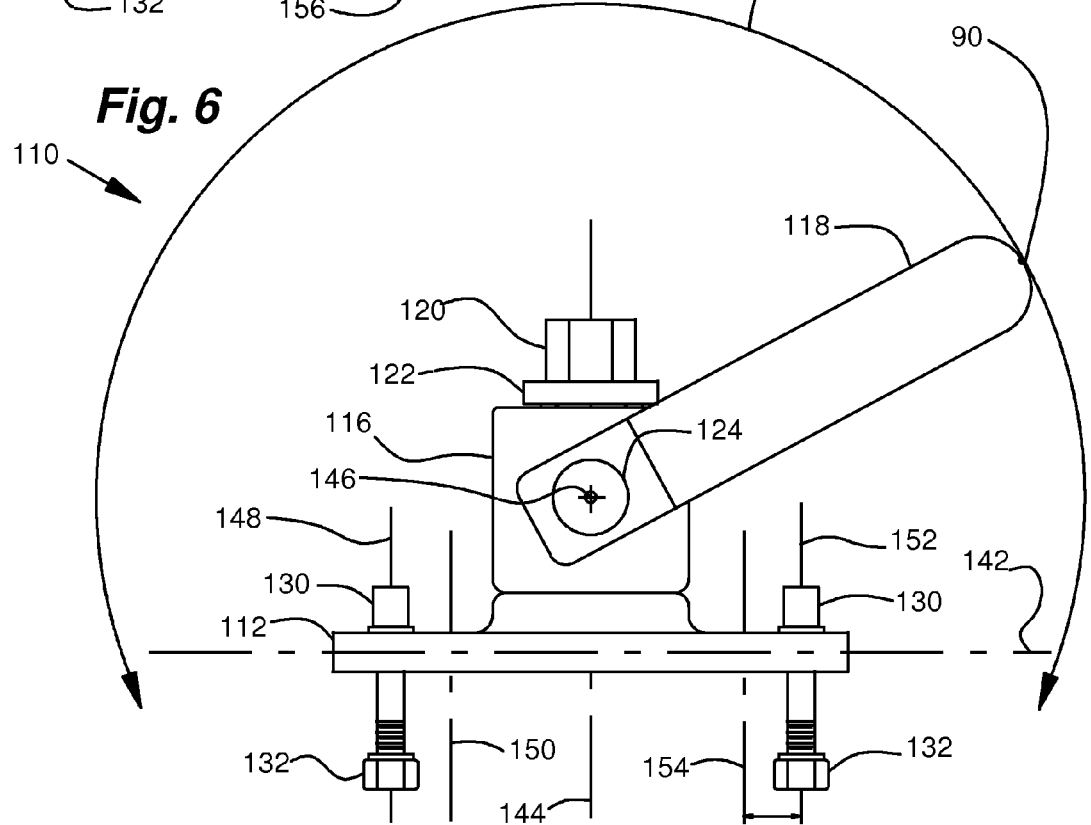

FIG. 6 is a diagrammatic front view of an embodiment of a top tool including a representation of an arc described by a point on a top bail pivoting about a top pivoting axis.

Figure 7:
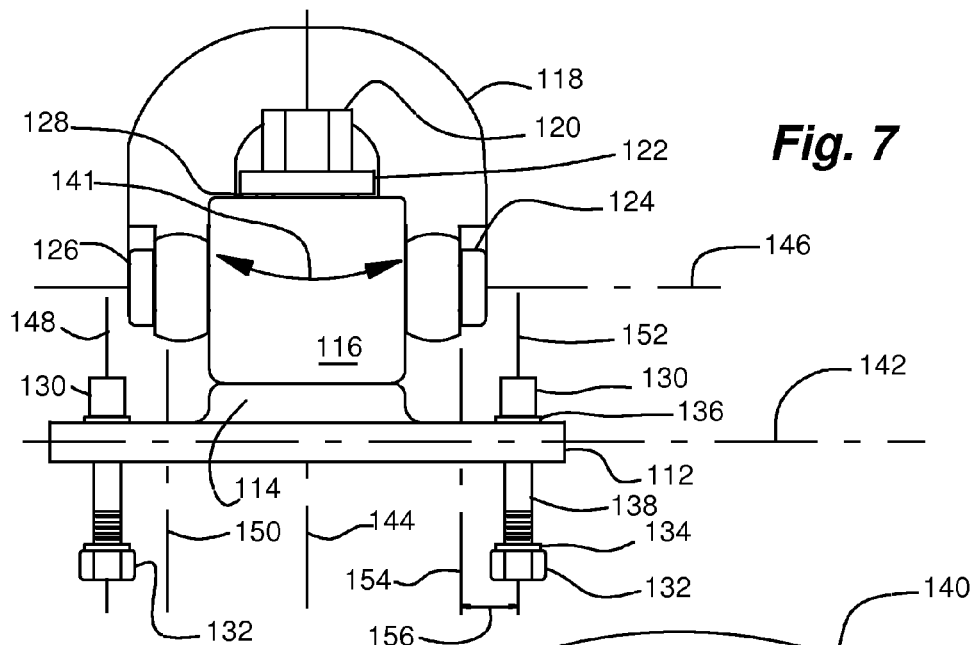

FIG. 7 is a diagrammatic front view of an embodiment of FIG. 6 in which the top bail has swiveled approximately 90 degrees from the position depicted in FIG. 6.

FIG. 8 is a diagrammatic top view of an embodiment of a top tool including a representation of an arc described by a point on a top bail swiveling about a top swiveling axis.

Figure 9:
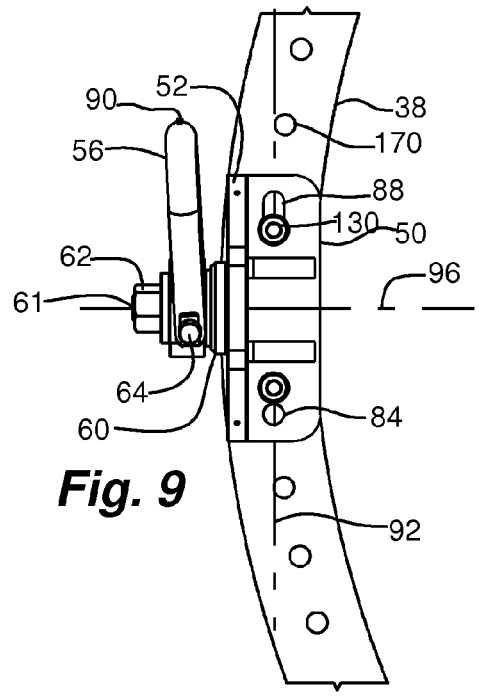

FIG. 9 is a diagrammatic top view of an embodiment of a bottom tool mounted to a bottom mounting ring of a tower segment.

Figure 10:
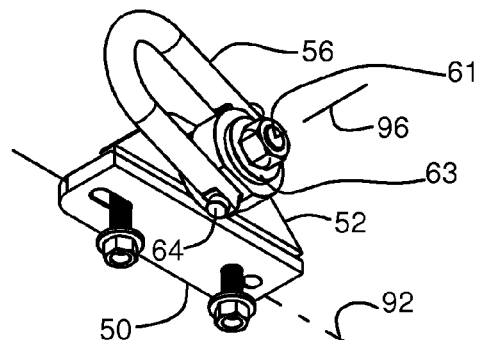

FIG. 10 is a diagrammatic perspective view of the bottom side of an embodiment of the bottom tool depicted in FIG. 9.

Figure 11:
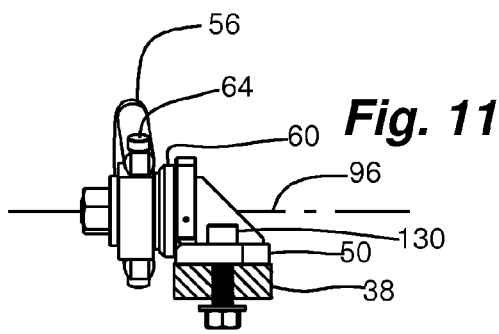

FIG. 11 is a diagrammatic side view of an embodiment of the bottom tool depicted in FIG. 9 showing the bottom mounting ring in cross-section.

Figure 12:
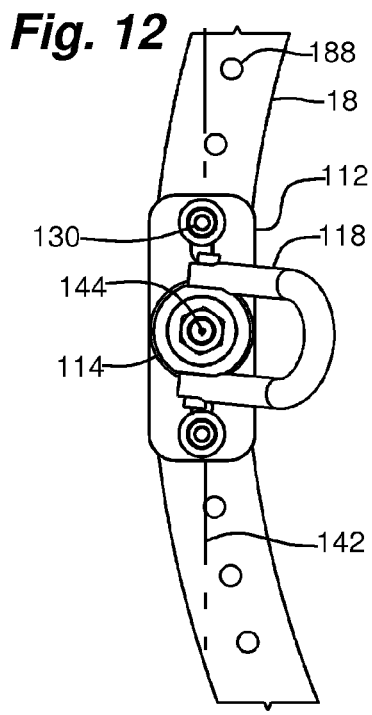

FIG. 12 is a diagrammatic top view of an embodiment of a top tool mounted to a top mounting ring of a tower segment.

Figure 13:
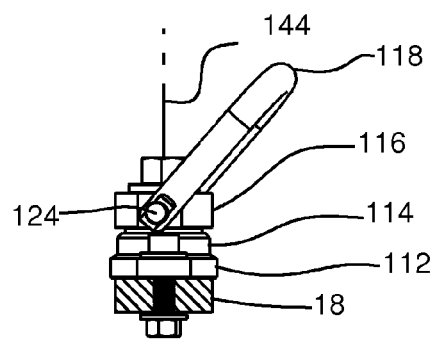

FIG. 13 is a diagrammatic side view of an embodiment of the top tool depicted in FIG. 12 showing the top mounting ring in cross-section.

Figure 14:
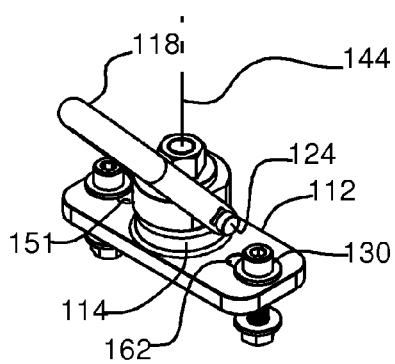

FIG. 14 is a diagrammatic perspective view of the top side of an embodiment of the top tool depicted in FIG. 12.

FIG. 15 is a diagrammatic top view of an embodiment of the bottom tool depicted in FIG. 16.

FIG. 16 is a diagrammatic side view of an embodiment of a bottom tool without the bottom bail and the body in which the bottom bail is mounted for pivoting and swiveling.

FIG. 17 is a diagrammatic front view of an embodiment of the bottom tool depicted in FIG. 16.

FIG. 18 is a diagrammatic perspective cross-sectional view of a bushing about which top and bottom bails swivel.

FIG. 19 is a diagrammatic front cross-sectional view of a bushing about which top and bottom bails swivel.

DETAILED DESCRIPTION OF THE PREFERRED EMBODIMENTS

Referring now to the drawings wherein like reference numerals designate identical or corresponding parts throughout the several views. It is to be understood that the drawings are diagrammatic and schematic representations of various embodiments of the invention, and are not to be construed as limiting the invention in any way. The use of words and phrases herein with reference to specific embodiments is not intended to limit the meanings of such words and phrases to those specific embodiments. Words and phrases herein are intended to have their ordinary meanings, unless a specific definition is set forth at length herein.

Referring particularly to the embodiments illustrated in the drawings, there is illustrated generally in the embodiments of FIGS. 1 through 3, a conventional lifting crane 10 that is liftingly attached through mounting tools to a heavy object such as, for example, tower segment 12. The mounting tools include four top tools, 20, 22, 24 and 26, releasably attached to top mounting ring 18, and two bottom tools releasably attached to bottom mounting ring 38. Top mounting ring 18 is attached to the normally upper end 16 of tower segment 12. Main lifting line 36 extends from lifting crane 10 to upper lifting lines 28, 30, 32, and 34. A bottom mounting ring 38 is located at the normally lower end 14 of tower segment 12, and is liftingly attached through bottom tools 40 and 42 and lower lifting lines 44 and 46 to a similar crane (not shown).

Top mounting ring 18, and bottom mounting ring 38 are generally annular and lie within top and bottom mounting ring planes, respectively. These planes extend generally normal to the object axis 21 of a heavy object such as tower segment 12. These respective rings generally form the opposed ends of tower segment 12. These rings generally serve as mounting members for the opposed ends of tower segment 12. These rings are generally adapted to being fastened to adjacent structures during the erection and use of a tower. For example, tower segments typically taper so that the bottom mounting ring of a tower segment is bigger than the top mounting ring on the same segment. When two tapered tower segments are assembled together, the bottom mounting ring of the uppermost tower segment is typically the same size as the top mounting ring of the tower segment immediately below it. For mounting purposes these respective rings generally include mounting ring holes that are configured to receive fastener elements therethrough. Such mounting holes typically extend generally normal to the respective top and bottom mounting planes, and parallel to the object axis 21 of the tower segment. Such fastener elements generally serve to secure top tools 20, 22, 24, and 26, and bottom tools 40 and 42 to the top and bottom mounting rings 18 and 38, respectively.

Tower segment 12 in the embodiment shown in FIG. 1 is shown in a generally vertical position. The removable bottom tools have been removed to allow the bottom mounting ring to be fastened to a mating structure such as, for example, a foundation or a mounting ring on another tower segment. When the tower segment has been securely attached to the structure below it, the removable top tools will be removed to allow the installation of some further structure on the top mounting ring, for example, a turbine mount or another tower segment. The top and bottom tools are then available for use in lifting other heavy objects that may have mounting rings with the same or different hole sizes or spacings. Tower segment 12 is shown in the embodiment of FIG. 2 with both ends hoisted and the object axis 21 of tower segment 12 in a generally horizontal position. In the embodiment of FIG. 3 the tower segment 12 is shown with both ends being lifted, and in a position that is intermediate the horizontal and vertical positions.

As shown particularly in the embodiments of FIGS. 2 and 3, bottom tools 40 and 42 are liftingly attached to mounting ring 38 and to lower lifting lines 44 and 46, respectively. During the erection phase of installing a tower segment or other heavy object, the initial function of the top and bottom tools is to allow the object to be lifted in the horizontal position shown in FIG. 2 until the object is clear of obstructions on the ground. As the heavy object is moved from the approximately horizontal position shown in FIG. 2 through that shown in FIG. 3 and into the generally vertical position shown in FIG. 1, the bottom tools 40 and 42 serve to stabilize and guide the normally lower end of tower segment 12 while carrying some of the load.

Only two bottom tools, 40 and 42, are required for the functions they perform. These bottom tools must be configured such that lifting lines 44 and 46 remain generally clear of the tower segment 12 as it is lifted and rotated from a generally horizontal to a generally vertical position. These lifting lines 44 and 46 extend along side of the tower segment. As the erection phase proceeds the lifting lines move from being approximately normal to the tower segment until they are aligned almost parallel to and beside the tower segment. To this end the bottom tools are generally spaced apart by less than 180 degrees, for example, 160, or 130 or even 100 degrees or less. The bottom tools are generally removably attached on the lowermost part of the bottom mounting ring. When the heavy object to which the bottom tools are mounted is in the vertical position, and near its installation position, the bottom tools may be removed to allow the completion of the installation of the heavy object. The bottom tools are then available for reuse in connection with the installation of some other heavy object.

The top tools are generally removably attached on the uppermost part of the top mounting ring. Four top tools spaced apart by equal angles are generally required to safely lift a heavy object such as tower segment 12, although more than or less than four tools may be used if a specific load requires it. For certain embodiments, four equally spaced top tools are generally required to accurately align and steady the heavy object as it is carefully moved into its intended installation location. Once the heavy object is properly positioned and secured in place, the top tools are removed, whereupon they become available for use in installing another heavy object.

Bottom tools 40 and 42 are specially configured so that their bottom bails 56 (FIGS. 4, 5, 9-11) swivel and pivot at locations such that lifting lines 44 and 46 remain clear of tower segment 12 and bottom mounting ring 38. The hemispheric envelope that results from such swiveling and pivoting projects laterally outwardly of bottom mounting ring 38 generally normal to object axis 21. By contrast, top tools 20, 22, 24, and 26 are configured so that their top bails 118 swivel and pivot to generate hemispheric envelopes that project axially upwardly of top mounting ring 22 generally parallel to object axis 21.

With particular reference to FIGS. 4, 5, 9-11, and 15-19, a bottom tool 48 includes a major axis 92, a minor axis 94 extending generally normal to major axis 92, a bottom swiveling axis 96 extending generally normal to both major axis 92 and minor axis 94, a bottom pivoting axis 98, a first fastener axis 100, a second fastener axis 102, and a third fastener axis 104. These respective fastener axes extend generally normal to and are arrayed along and approximately intersect with major axis 92, and extend generally parallel to minor axis 94.

With particular reference to FIGS. 6-8, and 12-14, a top tool, of which 20 is a typical embodiment, includes longitudinal axis 142, a top pivoting axis 146, a top swiveling axis 144 extending generally normal to longitudinal axis 142, a top swivel circle 164, a first mounting hole axis 148, a second mounting hole axis 150, and slotted mounting hole axes 152 and 154. These respective mounting hole axes extend generally normal to and are arrayed along longitudinal axis 142, and extend generally parallel to top swiveling axis 144. The respective pivoting axes define pivoting planes as swiveling about the respective swiveling axes takes place.

A bottom mounting bracket of the embodiment chosen for purposes of illustration is comprised of two mounting components and a bracing structure. In the embodiment chosen for illustration, a bottom ring mounting plate 50 is adapted to mate with and be secured to a generally flat lower surface of a bottom mounting ring 38. See particularly FIGS. 9 and 11. A hoist ring assembly is mounted to hoist ring mounting plate 52. Hoist ring mounting plate 52 is attached to bottom ring mounting plate 50 and braced there by brace plates 54. The bottom mounting bracket is generally "L" shaped with one leg formed by hoist ring mounting plate 52, and the other by bottom ring mounting plate 50. Hoist ring mounting plate 52 is offset relative to major axis 92 so that the hoist ring assembly is positioned laterally outwardly of bottom mounting ring 38, as shown particularly in FIGS. 9 and 11. This is very significant to safety, because it places the hemispheric envelope that is defined by the movement of the bail out away from the heavy object that it is mounted to. Thus, the bail's movement is not obstructed in any part of the hemispheric envelope. If the bail is prevented from pivoting and swiveling freely to align itself with the direction of the load, there is a serious possibility that the hoist ring assembly may be broken. If the hoist ring assembly fails the attached heavy object will drop and/or sway. An attached crane may be toppled, the object may be damaged, and people and other objects in the vicinity may be crushed.

First and second fastener axes 100 and 102 form the major axes of bottom mounting holes 84 and 86, respectively. Bottom mounting holes 84 and 86 are located in bottom ring mounting plate 50 on one side of bottom swivel axis 96, and slotted bottom mounting hole 88 is located in bottom ring mounting plate 50 on the opposite side of bottom swivel axis 96 from bottom mounting holes 84 and 86.

The spacing between the three bottom (and top) mounting holes, and the length of the slot in slotted bottom mounting hole 88, and slotted top mounting hole 162 (FIGS. 8 and 14), are selected so that the bottom and top mounting brackets will fit all of the anticipated hole spacings that are expected to be encountered in the mating mounting members to which they will be mounted. The lengths of the slotted mounting holes are generally equal to between approximately 2 and 4 diameters of the other mounting holes in the respective mounting brackets. The two generally annular mounting holes in both the top and bottom tools are generally spaced apart by a distance of from approximately 2 to 4 diameters. The spacing and slot length of the three mounting holes in the top and bottom tools are spaced and sized to accommodate all of the anticipated hole spacings that are expected to be so encountered.

For the sake of safety, one of the fastener elements is mounted in such a way as to preclude lateral sliding movement of the top or bottom mounting bracket relative to the structure to which it is mounted. This is accomplished in such a way as to leave the top and bottom tools with the capacity to fit different hole patterns (spacing) without the complexity and risk of added adjusting components. Costs of production and maintenance increase as complexity increases. Increasing the mechanical complexity of a lifting device generally increases the level of skill that is required to use it. Increasing the mechanical complexity also increases the risk that errors will be made in the use of the device. Safety is more likely to be compromised. A component that is not present can not fail or be misused.

In certain embodiments the capacity to fit different hole patterns safely without risk of slippage between the tool and the object is accomplished by providing a generally annular mounting hole and a generally cylindrical fastener element projected through this hole so there is very little clearance (approximately 0.010 or 0.005 inches more or less) between the internal wall of the mounting hole and the external wall of the fastener element. There is always one fastener element in such a generally annular mounting hole in addition to the fastener element that is in the slotted mounting hole. The use, for example, of two slotted mounting holes in the same tool to accommodate the necessary adjustment would possibly permit the mounting bracket to slip laterally generally along its major axis relative to the structure to which it is mounted. Such risk of slippage at some unpredictable time and in some unpredictable amount during the handling of a heavy object would be unacceptable in a critical safety device. Sudden slippage might cause shock loading on the entire lifting system with possible catastrophic failure as a result. The configuration of the mounting holes is generally similar in both the top and bottom tools with the common purpose of avoiding the possibility of such slippage.

It has been found that three mounting holes are generally sufficient to accommodate the mating structures. More generally annular mounting holes can be provided if desired but are not necessary for most embodiments. Lengthening the slot in the slotted mounting hole and/or changing the spacing between two generally annular mounting holes provides all of the adjustment necessary for most embodiments.

The sizes of the three mounting holes in the top and bottom tools should be minimized to not exceed the sizes that are required to safely support the maximum design loads. Larger holes unnecessarily weaken the tools. The holes in the structure to which the mounting bracket is mounted are frequently larger or smaller than the mating mounting holes in the top or bottom tools. Such size differences are accommodated without requiring a large inventory of tools with different hole sizes, and without compromising safety by, for example, increasing the mounting hole sizes in the tools and using bushings of various sizes to decrease the mounting hole sizes to match those in the mating structures. Such hole size differences are accommodated by providing stepped fastener elements in which part of the shank of the fastener element is sized to fit the holes in this structure and another part of the shank is sized to fit the top or bottom mounting holes in the mounting tools.

In certain embodiments the fastener elements take the form of studs that are threaded on both ends. If the holes in both the tools and the object to which the tolls are mounted the studs are about the same diameter for their entire axial lengths. See, for example, studs 65 in FIG. 4. If, for example, the mounting tools are moved to another structure where the holes in the structure to which the mounting tools are mounted are larger than the mating holes in the mounting tools themselves, the axially extending parts of these studs that engage the structure are made larger than the axially extending parts of these studs that engage the tools. See, for example, studs 66 in FIG. 5. The diameter of stud 66 is stepped down at 72 to a smaller diameter. The reduced diameter part 68 of stud 66 will pass through a mounting hole a mounting bracket such as 48. The larger diameter portion will fit a larger diameter hole in a mating structure. Threaded proximal and distal ends 70 and 74, respectively, of stud 66 permit threaded nuts of an appropriate size to be tightened down, thus securing a mounting tool such as, for example, bottom tool 48 or top tool 110 to a heavy object that is to be lifted. Threaded studs, such as studs 65 and 66 are secured in place, for example, by means of threaded nuts 75, 76, and 80. Washers 77, 78 and 82 are provided as is conventional in assemblies that are held together by threaded studs and nuts.

In certain embodiments the fastener elements take the form of headed bolts or machine screws. See, for example, headed bolts 138 in FIG. 7, wherein one end of a headed bolt is threaded to receive a threaded nut and associated washer. See, nuts 132 and associated washers 134. The heads 130 of headed bolts 138 are spaced from the upper surface of top mounting bracket 112 by washers 136.

The hoist ring assembly in bottom tool 48 comprises a bail 56 that is pivotally mounted to body 58 through pivot pins 64 for pivotal movement about bottom pivoting axis 98 through at least approximately 180 degrees. Body 58 is journaled for swiveling movement through 360 degrees on the external generally cylindrical surface of bushing 60 about bottom swiveling axis 96. A typical bushing is shown in cross-section in FIGS. 18 and 19, which are reference numbered to correspond to the embodiments of the top tools that are illustrated in FIGS. 6-8 and 12-14. The bushing is illustrated at reference number 114 in the embodiments of FIGS. 12-14. Throughout certain embodiments the elements of the hoist ring assembly are of the same general design, but the elements are not necessarily the same size or proportion in all embodiments. For example, slightly different sized bushings may be used in the top and bottom tools. Nut 62 is threadably attached to a body stud 61 (FIGS. 9 and 10) that is generally concentric with bottom swiveling axis 96. Body stud 61 is attached directly or indirectly to hoist ring mounting plate 52 so that tightening nut 62 causes thrust washer 63 (FIG. 10) to bear against the distal end of bushing 60, but without binding body 58 so it remains free to swivel about bottom swiveling axis 96. Thrust washer 63 retains body 58 on bushing 60, but does not bind it from freely swiveling. The proximal end of bushing 60 is secured to a mounting bracket such as a top mounting bracket or a bottom mounting bracket. According to certain embodiments the proximal end of bushing 60 is secured by way of welding to an associated mounting bracket.

Body stud 61, for example, may be threadably or weldably attached to bushing 60, or it may be threadably or weldably attached to an associated mounting bracket. According to certain embodiments (not illustrated), body stud 61 is replaced with a headed bolt that is threadably mounted to either a bushing or an associated mounting bracket. The load capacity of the hoist ring assembly is determined in significant part by the amount of torque that is applied to the body stud or headed bolt. Such a body stud or headed bolt is generally torqued to the proper level of tension by the manufacturer or a repair station. For large load capacity (approximately 50 tons or more) hoist ring assemblies, special tools are required to apply the torque. There is no need for a user of these mounting tools to be concerned with properly torquing such a body stud or headed bolt. Installation, removal, and reinstallation of embodiments of the mounting tools are all accomplished in the field without disturbing the torque settings on such body studs or headed bolts. Thus, there is no risk that the load bearing capacity of the mounting tool will be altered by normal usage in the field.

Top tool 110 includes a hoist ring assembly that is similar to that found in bottom tool 48. This hoist ring assembly includes a body 116, pivot pins 124 and 126, a bushing 114, a thrust washer 122, a headed body bolt 120, and a bail 118. These elements function together as previously described with reference to the hoist ring assembly in top tool 48. The slight gap between thrust washer 122 and body 116 is shown at 128. This gap allows body 116 to rotate freely about the bushing. Socket 160 in the head of headed body bolt 120 allows a wrench to be applied to tighten or loosen this bolt.

With particular reference to FIGS. 15-19, the inner elements of an embodiment of a hoist ring assembly are illustrated. An embodiment of a top tool has been chosen for purposes of illustration, but this will serve to illustrate the inner elements of embodiments of both top and bottom mounting tools. A flange 178 of a bushing is welded to a mounting bracket. The lower surface 180 of this bushing rests firmly on the mounting bracket. A generally cylindrical surface 174 of the bushing is adapted to journalingly support a body such as, for example, 116. The end 176 of the bushing is adapted to engage with a thrust washer such as, for example, 63 or 122. The generally cylindrical column of the bushing bears the tensioning load that is applied to body stud 190 by threadably tensioning body stud 190. Body stud 190 is mounted in bore 186 by means of threaded engagement with bushing thread 184. For purposes of illustration bushing thread 184 is shown as extending only part way along bore 186. In many embodiments, bushing thread 184 extends for the entire length of bore 186. Annular recess 182 in flange 178 serves to engage a skirt of a body such as, for example, 116.

Radially outermost points 90 on bails 56 and 118 generate generally hemispheric shaped envelopes as they move with the pivoting and swiveling of the hoist ring assemblies with which they are associated. A load is attached to the bail, and the bail moves omni-directionally within a generally hemisphericaly shaped envelope to align the bail with the direction from which the load is applied. A vector that points directly from the pivoting axis of a hoist ring assembly to the load generally passes approximately through point 90. The movement of point 90 is illustrated by pivoting arc 140 in FIG. 6 and swivel circle 164 in FIG. 8. Body rotational arc 141 in FIG. 7 illustrates how the body rotates around the bushing in a bushing assembly to permit the swiveling movement of point 90 in either direction.

According to certain embodiments the fastening of a bottom mounting bracket to a bottom mounting ring or other mounting member on a heavy object is accomplished by the use of two fastener elements, a first of which is projected fasteningly through one of bottom mounting holes 84 or 86 and into a first mating hole in a mating mounting member, and the second of which is projected fasteningly through slotted bottom mounting hole 88 and slipped laterally along this slotted mounting hole until it aligns with a second mating hole in the mating mounting member. If a mating hole can not be found for the second fastener element, the bottom mounting bracket is repositioned relative to the mating mounting member by moving the first fastener element from one of the bottom mounting holes 84 or 86 to the other.

Mounting tools such as, for example, 48 and 110 are comprised of mounting brackets, hoist ring assemblies, and fastener elements. Mounting tools are mounted to heavy objects through mounting structures such as, for example, top and bottom mounting rings 38 and 18. According to certain embodiments, fastener elements such as, for example, 65, 66, and 138 are projected through mating mounting holes such as, for example, 170, 84, 88, 188, 151, and 162 (FIGS. 8, 9 and 12) in the mounting brackets and mounting structures, and are releasably secured there to retain the mounting tools in the desired locations on the heavy objects. For purposes of adjustability, the mounting holes in a mounting bracket are aligned along a common axis such as, for example, 92 and 142. As shown particularly in FIGS. 6-9 and 12, even though the mating holes in a mating structure are arrayed along an arc, the use of two fastener elements with two generally annular mounting holes and one slotted hole provides a substantial amount of adjustability to accommodate different bolt patterns in the mounting structure. The distance 156 between axes 152 and 154, for example, defines the limits of travel that a bolt or stud can move laterally in a slotted mounting hole. A bolt or stud can be moved from one generally annular mounting hole to another as shown, for example, at axes 148 and 150. When the distance between axes 148 and 150 is added to distance 156 it is seen that an unexpectedly large amount of adjustability is provided by this arrangement. Further adjustability is provided by the use of stepped fastener elements to accommodate different mating hole sizes between the mounting brackets and the mounting structures. This flexibility is achieved without compromising safety by introducing added elements or operational complexities.

What has been described are preferred embodiments in which modifications and changes may be made without departing from the spirit and scope of the accompanying claims. Many modifications and variations of the present invention are possible in light of the above teachings. It is therefore to be understood that, within the scope of the appended claims, the invention may be practiced otherwise than as specifically described.

What is claimed is:

1. A mounting tool for use in lifting a heavy object wherein said heavy object includes a mounting structure, said mounting tool comprising:
   a mounting bracket, said mounting bracket having a slotted mounting hole and two generally annular mounting holes extending therethrough, said mounting holes being arrayed along a common axis;
   a hoist ring assembly mounted to said mounting bracket and including a bail being pivotally mounted to a body through pivot pins for pivoting movement through at least approximately 180 degrees generally around a pivoting axis, said body being journaled for swiveling movement through 360 degrees on an external generally cylindrical surface of a bushing about a swiveling axis, said swiveling axis extending approximately between said two generally annular mounting holes and said slotted mounting hole; and
   at least two fastener elements adapted to project fasteningly through said mounting holes and said mounting structure and be releasably secured there to retain the mounting tool on the object;
   wherein at least one of said fastener elements is a stepped fastener element having a stud with a proximal end, a distal end, a larger diameter portion extending from the distal end and a reduced diameter portion extending from the proximal end to the larger diameter portion, the larger diameter portion and the reduced diameter portion each having threading thereon.

2. A mounting tool of claim 1 wherein said heavy object has an object axis, and said swiveling axis is adapted to extend generally normal to said object axis, and said hoist ring assembly is adapted to being positioned generally laterally outwardly of said heavy object.

3. A mounting tool of claim 1 wherein said two generally annular mounting holes are located toward one end of said mounting tool, and said slotted mounting hole is located toward an opposed end of said mounting tool.

4. A mounting tool of claim 1 wherein said swiveling axis extends generally normal to said common axis.

\* \* \* \* \*